United States Patent [19]
Gonzales

[11] Patent Number: 4,957,230
[45] Date of Patent: Sep. 18, 1990

[54] SEAT-SUPPORTED COAT HANGER FOR AUTOMOBILES

[76] Inventor: Arthur V. Gonzales, 400 E. Remington Dr. #239, Sunnyvale, Calif. 94087

[21] Appl. No.: 410,828

[22] Filed: Sep. 22, 1989

[51] Int. Cl.⁵ .......................... B60R 7/04; A47C 7/64
[52] U.S. Cl. .............................. 224/42.46 A; 224/275; 223/88; 297/190
[58] Field of Search ......... 224/275, 42.42 R, 42.45 R, 224/42.45 A, 42.46 R, 42.46 A, 42.46 B; 223/85, 88, 91, 92, 93; 211/106; 297/190, 191; D6/343; D12/157

[56] References Cited

U.S. PATENT DOCUMENTS

| | | | |
|---|---|---|---|
| D. 175,337 | 8/1955 | Dion et al. | D6/343 |
| 835,464 | 11/1906 | Palmenberg | 223/88 |
| 1,591,786 | 7/1926 | Simpson | 223/88 |
| 1,722,122 | 7/1929 | Wilson | 211/106 |
| 2,255,973 | 9/1941 | Hoobler | 224/42.45 A |
| 2,262,581 | 11/1941 | Gonczy | 297/190 |
| 2,583,806 | 1/1952 | Batzle | 224/42.45 A |
| 2,601,177 | 6/1952 | Smullen | 224/42.46 B |

FOREIGN PATENT DOCUMENTS

| | | | |
|---|---|---|---|
| 1148425 | 12/1957 | France | 224/275 |
| 1495817 | 9/1967 | France | 223/85 |
| 0601468 | 1/1960 | Italy | 223/85 |
| 0290766 | 5/1928 | United Kingdom | 223/88 |

*Primary Examiner*—Henry J. Recla
*Assistant Examiner*—Casey Jacyna
*Attorney, Agent, or Firm*—John J. Leavitt

[57] ABSTRACT

Presented is a coat hanger providing a main body portion on which a coat may be draped in a wrinkle-free manner. The main body portion of the coat hanger is provided with a depending mounting structure that detachably clamps resiliently on the upper end portion of the back support portion of a cushioned automobile seat so that a coat hung on the coat hanger, hangs wrinkle-free behind the back support portion of the seat.

8 Claims, 2 Drawing Sheets

U.S. Patent   Sep. 18, 1990   Sheet 1 of 2   4,957,230
FIG_1
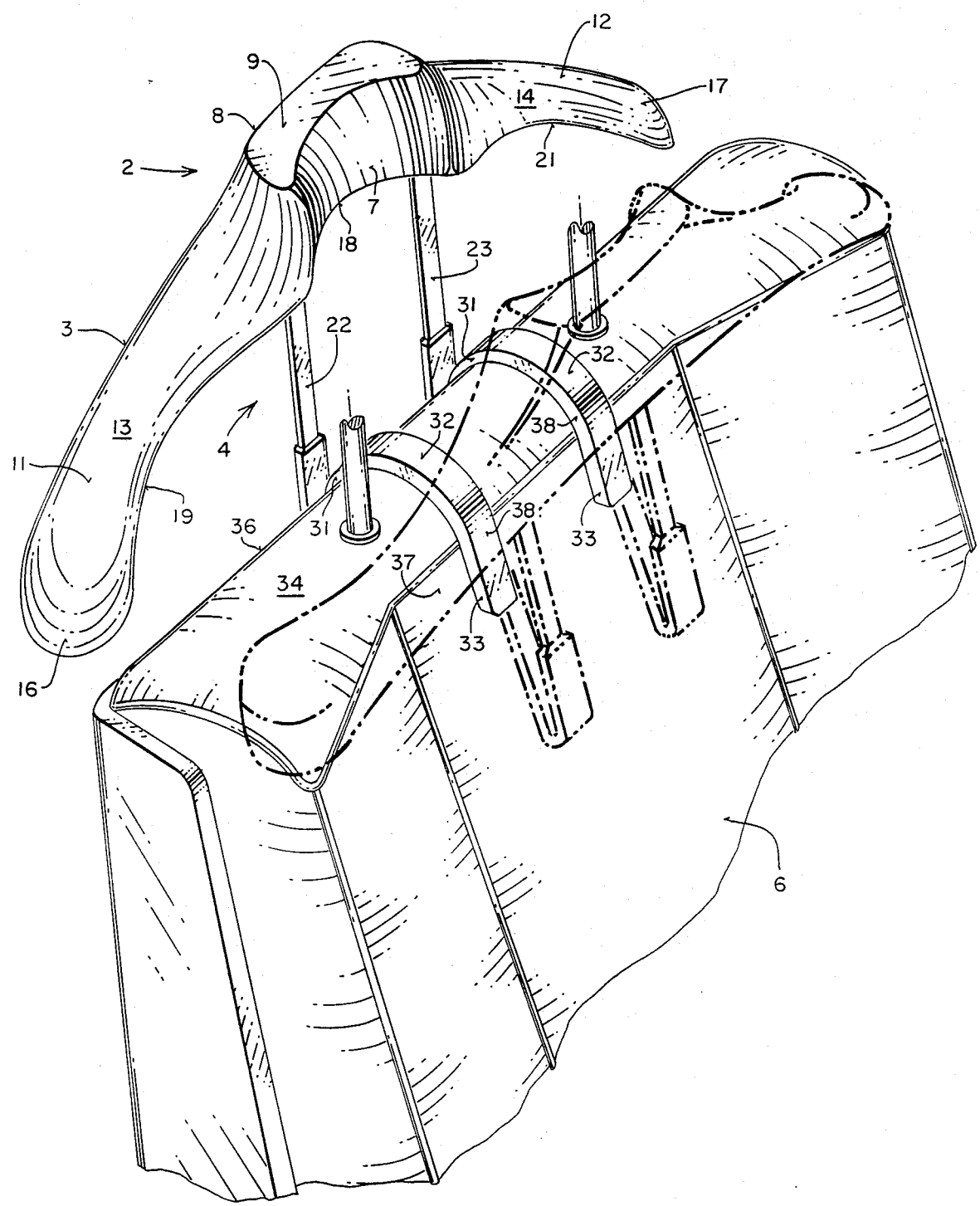

FIG_2
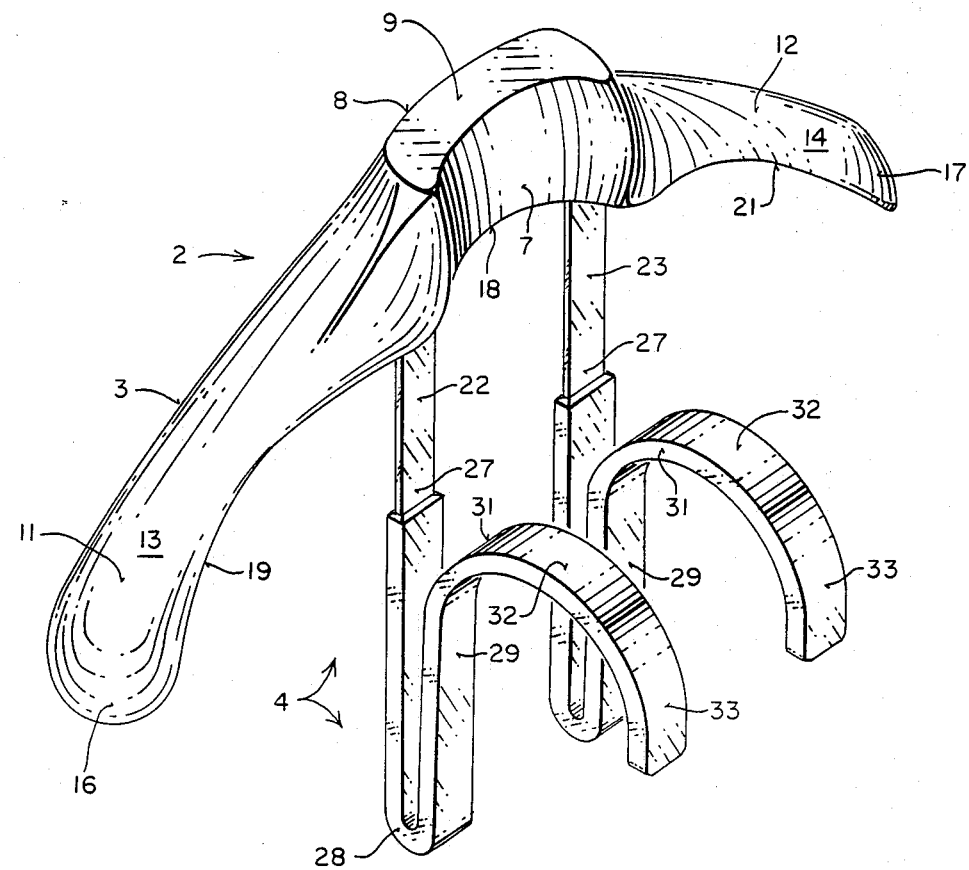
FIG 3
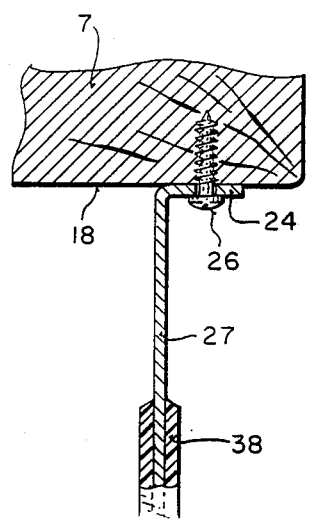
FIG 4
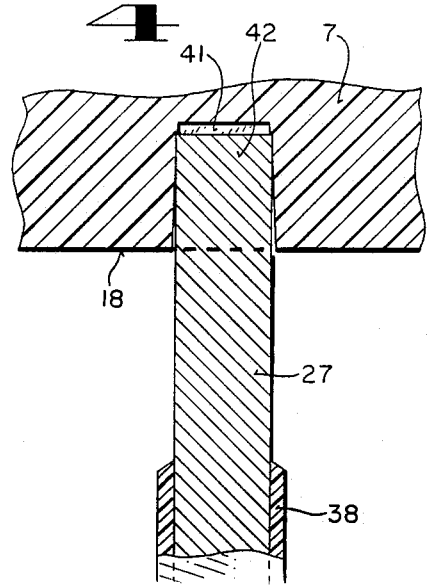

SEAT-SUPPORTED COAT HANGER FOR AUTOMOBILES

BACKGROUND OF THE INVENTION

1. Field of the Invention

This invention relates to garment hangers for use in automobiles, and particularly to a coat hanger adapted for detachable attachment on the back support portion of a cushioned automobile seat.

2. Description of the Prior Art

A preliminary patentability and novelty search conducted in connection with my invention revealed the existence of four U.S. patents as follows:

| 2,557,537 | 2,605,906 | 3,007,617 |
|-----------|-----------|-----------|
|           | 3,920,211 |           |

Referring to the patents noted above, U.S. Pat. Nos. 2,557,537 and 2,605,906 relate to garment hangers for use in an automobile, but the structures illustrated and described are completely different, being designed to engage the top edge of a car window.

U.S. Pat. No. 3,007,617 also relates to a coat hanger for use in an automobile, but is designed to be mounted on an unoccupied seat, and by its design, prevents normal use of the seat on which it is mounted.

U.S. Pat. No. 3,920,211 relates to a lunch box holder mounted on a car seat. This device also prevents normal use of the seat on which it is mounted.

There are few activities more destructive to fine suit coats and jackets than wearing such coats and jackets while sitting in an automobile, whether as the driver or a passenger. Because of the cramped quarters of modern-day cars, and the need to shift the body from time to time, severe stresses are imposed on seams, particularly in the shoulder area and on lining material. Accordingly, one of the objects of the present invention is the provision of a coat hanger that may easily be mounted on the back support portion of a cushioned seat structure to provide a convenient support on which a doffed suit coat or jacket may be hung.

Apart from destructive stresses imposed on seams, wearing a suit coat or jacket while seated in an automobile almost always results in the formation of unsightly wrinkles in the material. It is therefore another object of the invention to provide a coat hanger that enables suspension of a coat or jacket at full length behind the driver's seat or behind the front passenger seat so as to preclude the formation of such wrinkles.

The invention possesses other objects and features of advantage, some of which, with the foregoing, will be apparent from the following description and the drawings. It is to be understood however, that the invention is not limited to the embodiment illustrated and described, since it may be embodied in various forms within the scope of the appended claims.

SUMMARY OF THE INVENTION

In terms of broad inclusion, the coat hanger of the invention comprises a main body portion including a central coat collar supporting section and oppositely extending support sections projecting from the central section for supporting the shoulder portions of a suit coat or jacket. The main body portion may be formed from wood or plastic to provide an underside to which are attached a pair of spaced support straps, preferably formed from spring steel, and provided with lower end portions formed into resilient inverted U-shaped clamps adapted to resiliently grasp the upper end, front and back surfaces of the back support portion of a seat to which it is applied. The main body portion of the coat hanger thus projects above the upper end of the back support portion to provide a convenient support on which a coat or jacket may be hung.

BRIEF DESCRIPTION OF THE DRAWINGS

FIG. 1 is a perspective view of the coat hanger of the invention shown mounted on the back support portion of a cushioned automobile seat.

FIG. 2 is a perspective view of the coat hanger of the invention shown apart from other structure.

FIG. 3 is a fragmentary sectional view illustrating one method of attachment of the support strap members to the main body portion of the coat hanger.

FIG. 4 is a fragmentary sectional view illustrating the manner of attachment of the support strap members to the main body portion of the coat hanger when the latter is fabricated from a synthetic resinous material.

DESCRIPTION OF THE PREFERRED EMBODIMENT

In terms of greater detail, the coat hanger of my invention is designated generally by the numeral 2, and comprises a main body portion designated generally by the numeral 3, and a mounting structure designated generally by the numeral 4 for detachably mounting the coat hanger on the cushioned back support portion 6 of an automobile seat.

In the preferred embodiment, shown in FIGS. 1 and 2, the main body portion 3 is fabricated from wood, preferably cedar, but other types of wood may be used. The main body portion is formed by automatic equipment to provide a centrally disposed coat collar support section 7 having a gently curved rear surface 8 and a flat upper surface 9.

From the centrally disposed coat collar support section there extend in laterally opposite directions integral coat shoulder support sections 11 and 12. The coat shoulder support sections extend laterally outwardly in opposite directions and downwardly from the centrally disposed coat collar support section, the coat shoulder support sections having smooth convexly curved upper surfaces 13 and 14, respectively, terminating in smoothly rounded distal ends 16 and 17. The coat collar support portion is also provided with a flat underside 18 generally parallel with the flat upper surface 9, while the undersides 19 and 21 of the laterally extending coat shoulder support sections 11 and 12, respectively, are also flat, merging smoothly with the associated convexly curved surfaces 13 and 14, respectively.

The main body portion of the coat hanger is thus configured to support a coat or jacket hung thereon in substantially the same attitude in which the coat or jacket is in when worn. The coat collar support section is configured and proportioned in size to retain the collar section of a coat or jacket extended in the same manner as when the coat is worn, while the laterally extending coat shoulder support sections support the shoulder portions of the coat in the same manner in which these coat components are supported by a wearer's shoulders. The coat or jacket may thus be draped naturally on the coat hanger and is suspended in a wrinkle-free manner.

The mounting structure designated generally by the numeral 4 is attached to the flat underside surface 18 of the coat collar support section 7. The mounting structure, as illustrated, comprises identical laterally spaced mounting strap members 22 and 23 forming a pair. Since the straps are identical, the description of one will apply to the other. Accordingly, in the interest of brevity, only one mounting strap of the pair is described.

Each mounting strap is preferably formed from an appropriate metal strap, and at one end associated with the main body portion is provided in one embodiment with a mounting flange 24 (FIG. 3) detachably secured to the underside surface 18 by an appropriate fastener 26, such as a wood screw as illustrated. While I have illustrated the wood screw fastener 26 as directly engaging the wood main body portion, it should be understood that a metal insert (not shown) may be embedded in the wood and provided with a tapped and threaded bore to receive a machine screw instead of a wood screw.

From the mounting flange 24, the mounting strap extends downwardly perpendicularly from the flat underside surface 18 in a main straight section 27 that merges integrally through a bend section 28 with a reentrant straight section 29 spaced from and substantially parallel with the main straight section 27. The reentrant straight section 29 is only about half as long as the main straight section, and merges smoothly and integrally through bend section 31 with a forwardly projecting curved clamp section 32 that in turn merges smoothly and integrally with a downwardly projecting terminal section 33 as shown.

The reentrant straight section 29, the smoothly curved forwardly projecting clamp section 32, and the downwardly projecting terminal section 33 thus form a resilient, inverted, generally U-shaped clamp adapted to slip snugly over the upper end 34 of the cushioned back support portion 6 of the car seat. When so detachably engaged on the car seat, the reentrant straight section snugly abuts the rear surface 36 of the back support portion, while the curved clamp section 32 generally follows the contour of the upper end 34 thereof, and the downwardly projecting terminal section 33 snugly engages the front surface 37 of the back support portion of the car seat.

It will of course be understood that the specific configurations of the upper end portions of the back support portions of car seats of different model automobiles may vary from the configuration illustrated, and that the inverted U-shaped clamp-forming sections may be varied in their configuration to accommodate such different configurations without departing from the spirit of the invention as defined hereinafter in the claims.

Because some automobile seats are upholstered with materials that might be marred by application of bare metal clamps, the portions of the mounting straps 22 and 23 that come into contact with the upholstery are provided with a soft synthetic resinous or rubber protective covering 38 as illustrated.

While it is preferred that the main body portion 3 of the coat hanger be formed from a wood such as cedar or oak or a fruit wood that displays an attractive grain, such coat hangers are of course more expensive than coat hangers having a main body portion formed from appropriate synthetic resinous material. In the embodiment illustrated in FIG. 4, in which the main body portion is fabricated from synthetic resinous material, recesses 41, slightly tapered, are formed in the flat underside surface 18 to receive the terminal end portions 42 of the straps, which are jammed into the recesses and held tightly therein. Since during use of the coat hanger, the weight of a coat is added to the weight of the main body section, there is no tendency for the terminal end portions 42 of the straps to loosen in the recesses. The remainder of the mounting structure is as previously described in connection with FIGS. 1, 2 and 3 and will therefore not be reiterated.

Referring to FIG. 1 of the drawing, the coat hanger 2 is illustrated mounted behind the rear surface 36 of the back support portion and projecting above it. This is the preferred placement of the coat hanger on the back support portion. However, it is contemplated that in some situations, there may be a reason to mount the coat hanger so that it is positioned in front of and above the front surface 37 of the back support portion of an unoccupied passenger seat. This alternate arrangement is illustrated in FIG. 1 in phantom or broken lines.

Having thus described the invention, what is believed to be new and novel and sought to be protected by letters patent of the U.S. is as follows.

I claim:

1. A coat hanger for use in an automobile having a cushioned seat including a back support portion having front, back and upper end surfaces for suspending a doffed coat in a wrinkle-free manner thereon, comprising:
   (a) a main body portion having upper and lower surfaces and including a central coat collar supporting section and oppositely extending coat shoulder support sections; and
   (b) means mounted on the lower surface of said main body portion adapted to detachably engage the back support comprising a pair of spaced straps each attached at one end to the main body portion and terminating at its opposite end in an inverted U-shaped clamping portion adapted to engage the cushioned back support portion of the automobile seat.

2. The coat hanger according to claim 1, in which said main body portion is formed from wood.

3. The coat hanger according to claim 1, in which said main body portion is formed from synthetic resinous material.

4. The coat hanger according to claim 1, in which said main body portion when mounted on a cushioned back support portion extends above the upper end of said back support portion, and said means mounted on the lower surface of said main body portion adapted to detachably engage the back support portion extends below the upper end of said back support portion when attached thereto.

5. The coat hanger according to claim 1, in which the portions of said means mounted on said main body portion adapted to detachably engage the back support portion of a cushioned automobile seat are sheathed in a synthetic resinous material.

6. The coat hanger according to claim 1, in which said main body portion is formed from a synthetic resinous material and includes a lower surface, a pair of spaced recesses formed in said lower surface of the oppositely extending coat shoulder support sections, and said pair of spaced straps include end portions engaged in said spaced recesses.

7. The coat hanger according to claim 6, in which said spaced straps include end portions frictionally engaged in said spaced recesses.

8. The coat hanger according to claim 1, in which said pair of spaced straps are metal, and said inverted U-shaped clamping portion of each strap of said pair engages the front, back and upper end surfaces of said cushioned back support portion.

* * * * *